(12) United States Patent
Lin

(10) Patent No.: US 11,324,000 B2
(45) Date of Patent: May 3, 2022

(54) METHOD FOR INFORMATION TRANSMISSION, TERMINAL DEVICE AND CHIP

(71) Applicant: GUANGDONG OPPO MOBILE TELECOMMUNICATIONS CORP., LTD., Guangdong (CN)

(72) Inventor: Yanan Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/109,289

(22) Filed: Dec. 2, 2020

(65) Prior Publication Data
US 2021/0105770 A1    Apr. 8, 2021

Related U.S. Application Data

(63) Continuation of application No. PCT/CN2018/091333, filed on Jun. 14, 2018.

(51) Int. Cl.
*H04W 72/04* (2009.01)
*H04W 72/02* (2009.01)

(52) U.S. Cl.
CPC ....... *H04W 72/0446* (2013.01); *H04W 72/02* (2013.01)

(58) Field of Classification Search
CPC ................................................. H04W 72/0446
See application file for complete search history.

(56) References Cited

U.S. PATENT DOCUMENTS

| | | | |
|---|---|---|---|
| 9,215,705 B2 | 12/2015 | Seo | |
| 9,648,588 B2 | 5/2017 | Kim et al. | |
| 9,660,765 B1 * | 5/2017 | Suresh | H04L 1/1812 |
| 9,686,783 B1 * | 6/2017 | Patel | H04L 5/0053 |
| 9,826,540 B1 | 11/2017 | Li et al. | |
| 2011/0070845 A1 * | 3/2011 | Chen | H04W 72/042 455/91 |
| 2013/0155868 A1 * | 6/2013 | Seo | H03M 13/6525 370/241 |
| 2013/0265955 A1 | 10/2013 | Kim et al. | |

(Continued)

FOREIGN PATENT DOCUMENTS

| | | |
|---|---|---|
| CN | 101729455 A | 6/2010 |
| CN | 103188041 A | 7/2013 |

(Continued)

OTHER PUBLICATIONS

International Search Report in the international application No. PCT/CN2018/091333, dated Feb. 27, 2019.

(Continued)

*Primary Examiner* — Jung H Park
(74) *Attorney, Agent, or Firm* — Perkins Coie LLP

(57) ABSTRACT

A method for information transmission, a terminal device and a chip are provided. The method includes: a terminal device sends a first message to a network device, here, the first message includes a parameter for blind detection of a downlink control channel in a target resource region by the terminal device, and the parameter is configured to determine a maximum number of blind detections of the downlink control channel in the target resource region by the terminal device in a specified time.

19 Claims, 3 Drawing Sheets

A network device receives a first message sent by a terminal device, here, the first message includes a parameter for blind detection of a downlink control channel in a target resource region by the terminal device

(56) References Cited

U.S. PATENT DOCUMENTS

| | | | |
|---|---|---|---|
| 2014/0146768 A1* | 5/2014 | Seo | H04W 72/0453 370/329 |
| 2014/0254420 A1* | 9/2014 | Kim | H04W 24/08 370/252 |
| 2015/0078266 A1* | 3/2015 | Guo | H04L 5/0053 370/329 |
| 2015/0341956 A1* | 11/2015 | Sun | H04L 5/0001 370/329 |
| 2015/0358962 A1* | 12/2015 | Lee | H04L 27/26 370/336 |
| 2016/0088652 A1* | 3/2016 | Patel | H04W 72/14 370/329 |
| 2017/0099674 A1 | 4/2017 | Han et al. | |
| 2017/0245251 A1 | 8/2017 | Kim et al. | |
| 2017/0332386 A1* | 11/2017 | Li | H04W 72/1242 |
| 2017/0374569 A1* | 12/2017 | Lee | H04L 1/1671 |
| 2017/0374653 A1 | 12/2017 | Lee et al. | |
| 2018/0020443 A1 | 1/2018 | Lee et al. | |
| 2018/0027574 A1 | 1/2018 | Lee et al. | |
| 2018/0139024 A1* | 5/2018 | Shi | H04W 74/006 |
| 2018/0262398 A1* | 9/2018 | Chen | H04W 72/12 |
| 2018/0270799 A1* | 9/2018 | Noh | H04L 1/1812 |
| 2018/0279229 A1* | 9/2018 | Dinan | H04W 52/367 |
| 2018/0279289 A1* | 9/2018 | Islam | H04W 72/0446 |
| 2018/0324816 A1* | 11/2018 | Islam | H04W 72/042 |
| 2018/0368115 A1* | 12/2018 | Li | H04L 5/0037 |
| 2019/0223204 A1* | 7/2019 | Kim | H04B 1/00 |
| 2020/0015176 A1* | 1/2020 | Li | H04L 5/0082 |
| 2020/0015240 A1 | 1/2020 | Lee et al. | |
| 2020/0029338 A1 | 1/2020 | Lee et al. | |
| 2020/0204294 A1* | 6/2020 | Ma | H04W 52/0229 |
| 2020/0213837 A1* | 7/2020 | Pan | H04W 72/0446 |
| 2020/0236699 A1* | 7/2020 | Nakashima | H04W 72/1289 |
| 2020/0252978 A1* | 8/2020 | Yi | H04W 74/0833 |
| 2021/0045042 A1* | 2/2021 | Nakashima | H04W 48/16 |
| 2021/0092748 A1 | 3/2021 | Lee et al. | |

FOREIGN PATENT DOCUMENTS

| | | |
|---|---|---|
| CN | 107113603 A | 8/2017 |
| CN | 103891353 B | 1/2018 |
| CN | 107645777 A | 1/2018 |
| CN | 109121159 A | 1/2019 |
| EP | 3644642 A1 | 4/2020 |
| EP | 3661085 A1 | 6/2020 |
| RU | 2603010 C2 | 11/2016 |
| WO | 2011134385 A1 | 11/2011 |
| WO | 2017186003 A1 | 11/2017 |
| WO | 2018064555 A2 | 4/2018 |

OTHER PUBLICATIONS

NTT Docomo, Inc., Offline summary for AI 7.1.3.1.2 Search space, Discussion and Decision, 3GPP TSG RAN WG1 Meeting #93 R1-1807638, May 21-25, 2018.

3GPP TS 38.331 V15.1.0 (Mar. 2018), 3rd Generation Partnership Project; Technical Specification Group Radio Access Network NR; Radio Resource Control (RRC) protocol specification (Release 15).

3GPP TS 38.213 V15.1.0 (Mar. 2018), 3rd Generation Partnership Project; Technical Specification Group Radio Access Network NR; Physical layer procedures for control (Release 15).

Supplementary European Search Report in the European application No. 18922628.5, dated Apr. 26, 2021.

First Office Action of the Russian application No. 2020143767, dated Sep. 3, 2021. 11 pages with English translation.

Examination Report for Indian application No. 202117000152, dated Jan. 3, 2022. 6 pages with English translation.

First Office Action of the European application No. 18922628.5, dated Jan. 14, 2022. 6 pages.

Vivo: "Remaining issues on search space design", 3GPP Draft; R1-1717484; vol. RAN WG1, No. Prague, Czech Republic; Oct. 9, 2017-Oct. 13, 2017 Oct. 8, 2017 (Oct. 8, 2017), XP051340672. 9 pages.

First Office Action of the Chinese application No. 202011554326.0, dated Mar. 2, 2022, 15 pages with English translation.

* cited by examiner

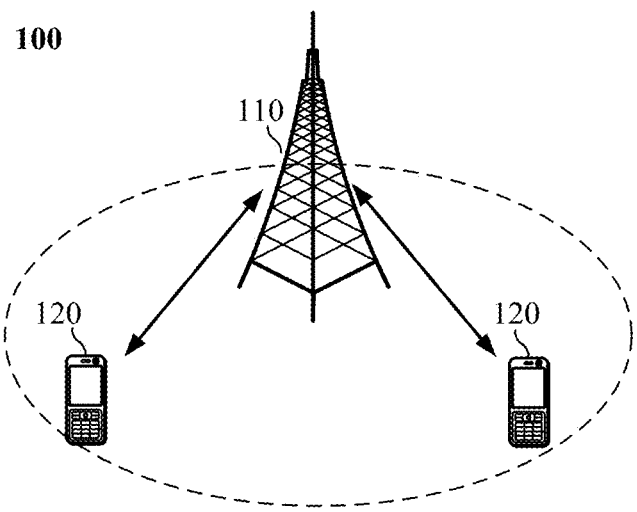

A terminal device sends a first message to a network device, here, the first message includes a parameter for blind detection of a downlink control channel in a target resource region by the terminal device    — 201

A network device receives a first message sent by a terminal device, here, the first message includes a parameter for blind detection of a downlink control channel in a target resource region by the terminal device    — 301

FIG. 3

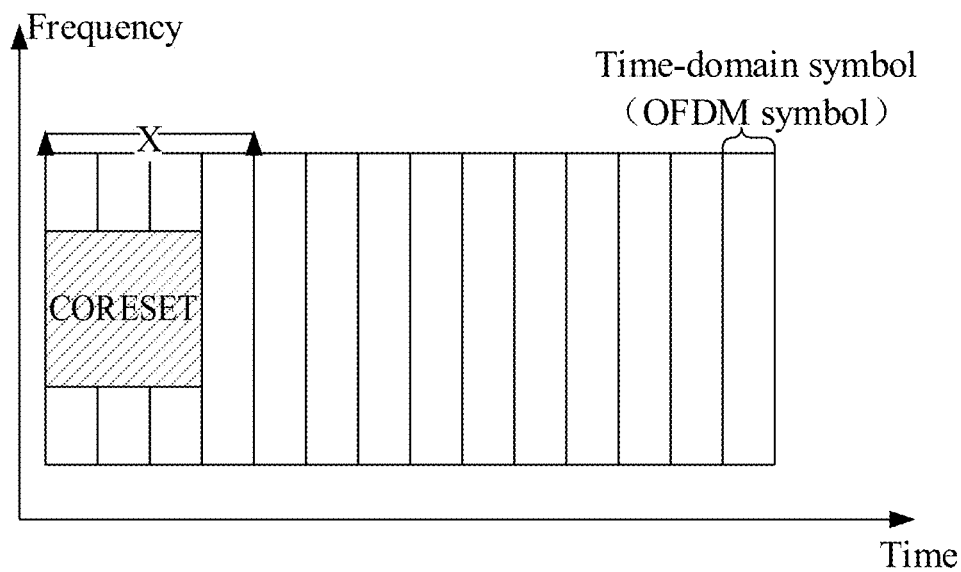

FIG. 4

METHOD FOR INFORMATION TRANSMISSION, TERMINAL DEVICE AND CHIP

CROSS-REFERENCE TO RELATED APPLICATIONS

The application is a continuation application of PCT Application No. PCT/CN2018/091333 filed on Jun. 14, 2018, the disclosure of which is incorporated by reference herein in its entity.

BACKGROUND

For meeting the pursuits of people for rate, latency, high-speed mobility and energy efficiency of services as well as diversity and complexity of services in the future, the 3rd Generation Partnership Project (3GPP) as the international standards organization has begun to research and develop the 5th Generation (5G) mobile networks.

An Ultra-Reliable Low Latency Communication (URLLC) service is introduced into a 5G New Radio (NR) system, and the service has the characteristic that ultra-reliable (for example, 99.999%) transmission is implemented within an extremely low latency (for example, 1 ms). For achieving this purpose, a relatively short Transmission Time Interval (TTI) is required to be used for data transmission, which means that downlink control signaling is required to be transmitted more frequently.

In NR Release-15 (Rel-15), one Control Resource Set (CORESET) supports the maximum number 44 of blind detections. The CORESET supports three lengths in time, i.e., one Orthogonal Frequency Division Multiplexing (OFDM) symbol, two OFDM symbols and three OFDM symbols respectively. The time in which a terminal device performs blind detection for the CORESET is usually longer than the length of the CORESET but not exceed a length of one slot (14 OFDM symbols). When multiple CORESETs are configured for a terminal device in one slot, for avoiding increase of implementation complexity of the terminal device, at present, the terminal device is limited to still only support the maximum number 44 of blind detections. That is, the maximum number of blind detections for each of the multiple CORESETs is limited, which will apparently affect flexibility of the scheduling.

SUMMARY

The embodiments of the disclosure relate to the field of wireless communication technologies and provide a method for information transmission, a terminal device and a chip.

In a first aspect, the embodiments of the disclosure provide a method for information transmission, which may include the following operation.

A terminal device sends a first message to a network device, here, the first message includes a parameter for blind detection of a downlink control channel in a target resource region by the terminal device, and the parameter is configured to determine a maximum number of blind detections of the downlink control channel in the target resource region by the terminal device in a specified time.

In a second aspect, the embodiments of the disclosure provide a method for information transmission, which may include the following operation.

A network device receives a first message sent by a terminal device, here, the first message includes a parameter for blind detection of a downlink control channel in a target resource region by the terminal device, and the parameter is configured to determine a maximum number of blind detections of the downlink control channel in the target resource region by the terminal device in a specified time.

In a third aspect, the embodiments of the disclosure provide a terminal device, which may include a processor, a transceiver and a memory.

The memory is configured to store computer program instructions that, when executed by the processor, cause the processor to send a first message to a network device through the transceiver, here, the first message includes a parameter for blind detection of a downlink control channel in a target resource region by the terminal device, and the parameter is configured to determine a maximum number of blind detections of the downlink control channel in the target resource region by the terminal device in a specified time.

In a fourth aspect, the embodiments of the disclosure provide a chip, which may include a processor, configured to call and run a computer program in a memory to enable a device installed with the chip to perform a method for information transmission, the method comprising: sending a first message to a network device, here, the first message includes a parameter for blind detection of a downlink control channel in a target resource region by the device, and the parameter is configured to determine a maximum number of blind detections of the downlink control channel in the target resource region by the device in a specified time.

BRIEF DESCRIPTION OF THE DRAWINGS

The drawings described herein are adopted to provide a further understanding to the disclosure and form a part of the disclosure. The schematic embodiments of the disclosure and descriptions thereof are adopted to explain the disclosure and not intended to form improper limits to the disclosure. In the drawings:

FIG. 1 is an architecture diagram of a communication system according to an embodiment of the disclosure.

FIG. 2 is a first flowchart of a method for information transmission according to an embodiment of the disclosure.

FIG. 3 is a second flowchart of a method for information transmission according to an embodiment of the disclosure.

FIG. 4 is a first diagram of blind detection according to an embodiment of the disclosure.

DETAILED DESCRIPTION

Figure 5:
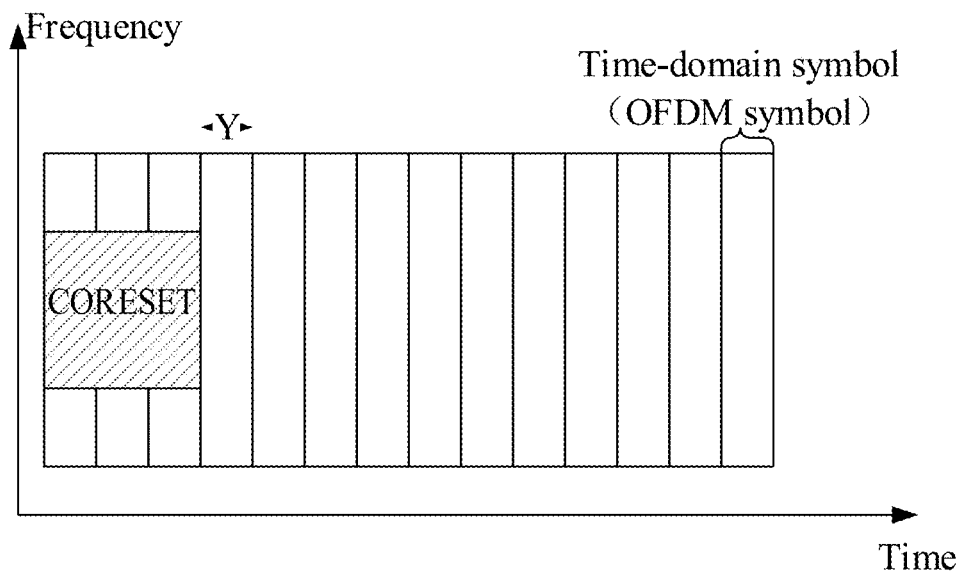
FIG. 5 is a second diagram of blind detection according to an embodiment of the disclosure.

In NR Rel-16, a key point for enhancement of URLLC is to improve a monitoring capability for a Physical Downlink Control Channel (PDCCH), namely increasing the number of blind detections performed by a terminal device in one slot. How to configure the proper number of blind detections for a terminal device to improve the scheduling flexibility on the premise of ensuring that the terminal device can complete demodulation is a problem that can be solved in the embodiments of the disclosure.

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

The technical solutions of the embodiments of the disclosure may be applied to various communication systems, for example, a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD) system, a Universal Mobile Telecommunication System (UMTS), a Worldwide Interoperability for Microwave Access (WiMAX) communication system or a future 5G system.

Exemplarily, a communication system 100 to which the embodiments of the disclosure are applied is illustrated in FIG. 1. The communication system 100 may include a network device 110, and the network device 110 may be a device communicating with a terminal device 120 (or called a communication terminal device or a terminal device). The network device 110 may provide communication coverage for a specific geographical region and may communicate with a terminal device located in the coverage. Optionally, the network device 110 may be a Base Transceiver Station (BTS) in the GSM system or the CDMA system, or may be a NodeB (NB) in the WCDMA system, or may be an Evolutional Node B (eNB or eNodeB) in the LTE system or a wireless controller in a Cloud Radio Access Network (CRAN). Or the network device may be a mobile switching center, a relay station, an access point, a vehicle device, a wearable device, a hub, a switch, a network bridge, a router, a network-side device in a 5G network, a network device in a future evolved Public Land Mobile Network (PLMN) or the like.

The communication system 100 further includes at least one terminal device 120 within the coverage of the network device 110. A "terminal device" used herein includes, but not limited to, a device arranged to receive/send a communication signal through a wired line connection (for example, Public Switched Telephone Network (PSTN), Digital Subscriber Line (DSL), digital cable or direct cable connections), and/or through another data connection/network, and/or through a wireless interface (for example, a cellular network, a Wireless Local Area Network (WLAN), a digital television network such as a Digital Video Broadcasting-Handheld (DVB-H) network, a satellite network or an Amplitude Modulated (AM)-Frequency Modulated (FM) broadcast transmitter), and/or through another communication terminal; and/or an Internet of Things (IoT) device. The terminal device arranged to communicate through a wireless interface may be called a "wireless communication terminal device", a "wireless terminal device" or a "mobile terminal device". Examples of a mobile terminal device include, but not limited to, a satellite or cellular telephone, a Personal Communication System (PCS) terminal device capable of combining a cellular radio telephone and data processing, faxing and data communication capabilities, a Personal Digital Assistant (PDA) capable of including a radio telephone, a pager, Internet/intranet access, a Web browser, a notepad, a calendar and/or a Global Positioning System (GPS) receiver, and a conventional laptop and/or palmtop receiver or another electronic device including a radio telephone transceiver. The terminal device may be an access terminal device, User Equipment (UE), a user unit, a user station, a mobile station, a mobile radio station, a remote station, a remote terminal device, a mobile device, a user terminal device, a terminal device, a wireless communication device, a user agent or a user device. The access terminal device may be a cell phone, a cordless phone, a Session Initiation Protocol (SIP) phone, a Wireless Local Loop (WLL) station, a PDA, a handheld device with a wireless communication function, a computing device, another processing device connected to a wireless modem, a vehicle device, a wearable device, a terminal device in the 5G network, a terminal device in the future evolved PLMN or the like.

Optionally, Device to Device (D2D) communication may be performed between the terminal devices 120.

Optionally, the 5G system or the 5G network may also be called a NR system or a NR network.

One network device and two terminal devices are exemplarily illustrated in FIG. 1. Optionally, the communication system 100 may include multiple network devices and another number of terminal devices may be included in coverage of each network device. There are no limits made thereto in the embodiments of the disclosure.

Optionally, the communication system 100 may further include another network entity such as a network controller and a mobility management entity. There are no limits made thereto in the embodiments of the disclosure.

It is to be understood that a device with a communication function in the network/system in the embodiments of the disclosure may be called a communication device. For example, for the communication system 100 illustrated in FIG. 1, communication devices may include the network device 110 and terminal device 120 with the communication function, and the network device 110 and the terminal device 120 may be the specific devices mentioned above and will not be elaborated herein. The communication devices may further include other devices in the communication system 100, for example, other network entities such as a network controller and a mobility management entity. There are no limits made thereto in the embodiments of the disclosure.

It is to be understood that terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

FIG. 2 is a first flowchart of a method for information transmission according to an embodiment of the disclosure. As illustrated in FIG. 2, the method for information transmission includes the following operation.

In 201, a terminal device sends a first message to a network device, here, the first message includes a parameter for blind detection of a downlink control channel in a target resource region by the terminal device.

In the embodiment of the disclosure, the terminal device may be any device capable of communicating with the network device, such as a mobile phone, a notebook computer, a desktop computer or a tablet computer. Furthermore, the terminal device supports a URLLC service. That is, the terminal device supporting the URLLC service reports the parameter to the network device.

In the embodiment of the disclosure, the network device may be a base station, for example, a gNB in 5G.

In the embodiment of the disclosure, the target resource region is a CORESET; or, the target resource region includes at least one consecutive time-domain symbol in a time domain.

In the embodiment of the disclosure, the parameter for blind detection of the downlink control channel in the target resource region by the terminal device may be implemented in the following manners.

A first manner: the parameter is configured to determine a first time length, and the first time length is configured to determine a time required by the terminal device to perform blind detection of the downlink control channel in the target resource region for N times, N≥1.

Herein, a value of N is predefined by a protocol, or is reported to the network device by the terminal device, or is configured to the terminal device by the network device. For example, N=44.

In the embodiment of the disclosure, the parameter is configured to determine the first time length, which may be implemented in the following manners: 1) the parameter indicates a specific time length, for example, the parameter may be the first time length; 2) the parameter indicates a time level, different time levels correspond to different first time lengths, and a corresponding first time length may be determined through a certain time level.

Herein, the first time length is an absolute time length; or, the first time length is an integral multiple of a time-domain symbol (for example, OFDM symbol) length.

For example, if the parameter is X=4, here, X represents the first time length, the first time length is four time-domain symbols. For another example, if the parameter is L=1, here, L represents the time level, the first time length is a time length corresponding to the time level 1, and is hypothesized to be three symbols.

In an implementation mode, the first time length is configured to determine the time required by the terminal device to perform blind detection of the downlink control channel in the target resource region for N times, which means that: the first time length is configured to determine a shortest time or a lower time limit required by the terminal device to perform blind detection of the downlink control channel in the target resource region for N times.

In the embodiment of the disclosure, a starting position of the time required by the terminal device to perform blind detection of the downlink control channel in the target resource region for N times is a predefined time position in the target resource region. In an implementation mode, the predefined time position is a time-domain starting position of the target resource region, or a starting position of a second time-domain symbol in the target resource region, or an ending position of a time-domain symbol where a DMRS is located in the target resource region. For example, the predefined time position is the time-domain starting position of the target resource region, that is, the terminal device performs blind detection of the downlink control channel starting from the time-domain starting position of the target resource region. For another example, the predefined time position is the starting position of the second time-domain symbol in the target resource region, that is, the terminal device performs blind detection of the downlink control channel starting from the starting position of the second time-domain symbol in the target resource region. For another example, the predefined time position is the ending position of the time-domain symbol where the DMRS is located in the target resource region, that is, the terminal device performs blind detection of the downlink control channel starting from the ending position of the time-domain symbol where the DMRS is located in the target resource region.

In the embodiment of the disclosure, a length of the time required by the terminal device to perform blind detection of the downlink control channel in the target resource region for N times may be determined in the following two manners.

1) The length of the time required by the terminal device to perform blind detection of the downlink control channel in the target resource region for N times is the first time length.

Herein, the first time length is a total time length for blind detection.

2) The length of the time required by the terminal device to perform blind detection of the downlink control channel in the target resource region for N times is a sum of a predefined time length of the target resource region and the first time length, here, the predefined time length is a length from the predefined time position to an ending position of a last time-domain symbol in the target resource region. For example, the predefined time length is a length from the starting position of the first time-domain symbol to the ending position of the last time-domain symbol in the target resource region. For another example, the predefined time length is a length from the starting position of the second time-domain symbol to the ending position of the last time-domain symbol in the target resource region. For another example, the predefined time length is a length from the ending position of the time-domain symbol where the DMRS is located to the ending position of the last time-domain symbol in the target resource region.

Herein, the predefined time length of the target resource region is added to the first time length to obtain a total time length for blind detection.

In the embodiment of the disclosure, the target resource region supports P transmission resource configurations, P≥2, and different transmission resource configurations have different time-domain lengths and/or different frequency-domain lengths. Here, when different transmission resource configurations are adopted for the target resource region, different values of N are correspondingly adopted.

For example, the target resource region is a CORESET, a time length of the CORESET (i.e., a length of the CORESET in time) may be one OFDM symbol, or may be two OFDM symbols or may be three OFDM symbols. These three conditions correspond to three transmission resource configurations respectively, and the three transmission resource configurations correspond to different values of N respectively.

In the embodiment of the disclosure, the target resource region supports P transmission resource configurations, P≥2, and different transmission resource configurations have different time-domain lengths and/or different frequency-domain lengths. Here, the parameter includes Q first time lengths, 1≤Q≤P, and each of the Q first time lengths corresponds to a different transmission resource configuration.

For example, the target resource region is a CORESET, a time length of the CORESET may be one OFDM symbol, or may be two OFDM symbols or may be three OFDM symbols. These three conditions correspond to three transmission resource configurations respectively, and the parameter includes three first time lengths corresponding to the three transmission resource configurations respectively.

A second manner: the parameter is configured to determine a maximum number of blind detections of the downlink control channel in the target resource region by the terminal device in a specified time.

In the embodiment of the disclosure, the parameter is configured to determine the maximum number of blind detections, which may be implemented in the following manners: 1) the parameter indicates the specific number of blind detections; 2) the parameter indicates a blind detection level, different blind detection levels correspond to different numbers of blind detections, and a corresponding number of blind detections may be determined through a certain blind detection level.

In the embodiment of the disclosure, a starting position of the specified time is a predefined time position in the target resource region. In an implementation mode, the predefined time position is a time-domain starting position of the target resource region, or a starting position of a second time-domain symbol in the target resource region, or an ending position of a time-domain symbol where a DMRS is located in the target resource region. For example, the predefined time position is the time-domain starting position of the target resource region, that is, the terminal device performs blind detection of the downlink control channel starting from the time-domain starting position of the target resource region. For another example, the predefined time position is the starting position of the second time-domain symbol in the target resource region, that is, the terminal device performs blind detection of the downlink control channel starting from the starting position of the second time-domain symbol in the target resource region. For another example, the predefined time position is the ending position of the time-domain symbol where the DMRS is located in the target resource region, that is, the terminal device performs blind detection of the downlink control channel starting from the ending position of the time-domain symbol where the DMRS is located in the target resource region.

In the embodiment of the disclosure, a time for blind detection of the downlink control channel in the target resource region by the terminal device, i.e., the specified time, may be determined in the following two manners.

1) A length of the specified time is a second time length.

Herein, the second time length is a total time length for blind detection (i.e., the length of the specified time).

2) A length of the specified time is a sum of a predefined time length of the target resource region and a second time length, here, the predefined time length is a length from the predefined time position to an ending position of a last time-domain symbol in the target resource region. For example, the predefined time length is the length from the starting position of the first time-domain symbol to the ending position of the last time-domain symbol in the target resource region. For another example, the predefined time length is the length from the starting position of the second time-domain symbol to the ending position of the last time-domain symbol in the target resource region. For another example, the predefined time length is the length from the ending position of the time-domain symbol where the DMRS is located to the ending position of the last time-domain symbol in the target resource region.

Herein, the predefined time length of the target resource region is added to the second time length to obtain a total time length for blind detection.

Herein, the second time length is predefined by the protocol, or is reported to the network device by the terminal device, or is configured to the terminal device by the network device.

Herein, the second time length is an absolute time length; or, the second time length is an integral multiple of a time-domain symbol (for example, OFDM symbol) length.

In the embodiment of the disclosure, the target resource region supports P transmission resource configurations, $P \geq 2$, and different transmission resource configurations have different time-domain lengths and/or different frequency-domain lengths. Here, when different transmission resource configurations are adopted for the target resource region, different maximum numbers of blind detections are correspondingly adopted.

For example, the target resource region is a CORESET, a time length of the CORESET may be one OFDM symbol, or may be two OFDM symbols or may be three OFDM symbols, these three conditions correspond to three transmission resource configurations respectively, and the three transmission resource configurations correspond to different maximum numbers of blind detections respectively.

In the embodiment of the disclosure, the target resource region supports P transmission resource configurations, $P \geq 2$, and different transmission resource configurations have different time-domain lengths and/or different frequency-domain lengths. The parameter includes T values, $1 \leq T \leq P$, and each of the T values corresponds to a different transmission resource configuration.

For example, the target resource region is a CORESET, a time length of the CORESET may be one OFDM symbol, or may be two OFDM symbols or may be three OFDM symbols, these three conditions correspond to three transmission resource configurations respectively, the parameter includes three values, configured to determine three maximum numbers of blind detections respectively, and these three maximum numbers of blind detections correspond to the three transmission resource configurations respectively.

In the embodiment of the disclosure, the terminal device reports, to the base station, a specific demodulation capability for blind detection of a PDCCH, and the base station can reasonably configure the CORESET, thereby improving the flexibility of data scheduling of the terminal supporting URLLC.

FIG. 3 is a second flowchart of a method for information transmission according to an embodiment of the disclosure. As illustrated in FIG. 3, the method for information transmission includes the following operation.

In 301, a network device receives a first message sent by a terminal device, here, the first message includes a parameter for blind detection of a downlink control channel in a target resource region by the terminal device.

In the embodiment of the disclosure, the terminal device may be any device capable of communicating with the network device, such as a mobile phone, a notebook computer, a desktop computer or a tablet computer. Furthermore, the terminal device supports a URLLC service. That is, the terminal device supporting the URLLC service reports the parameter to the network device.

In the embodiment of the disclosure, the network device may be a base station, for example, a gNB in 5G.

In the embodiment of the disclosure, the target resource region is a CORESET; or, the target resource region includes at least one consecutive time-domain symbol in a time domain.

In the embodiment of the disclosure, the parameter for blind detection of the downlink control channel in the target resource region by the terminal device may be implemented in the following manners.

A first manner: the parameter is configured to determine a first time length, and the first time length is configured to determine a time required by the terminal device to perform blind detection of the downlink control channel in the target resource region for N times, N≥1.

Herein, a value of N is predefined by a protocol, or is reported to the network device by the terminal device, or is configured to the terminal device by the network device. For example, N=44.

In the embodiment of the disclosure, the parameter is configured to determine the first time length, which may be implemented in the following manners: 1) the parameter indicates a specific time length, for example, the parameter may be the first time length; 2) the parameter indicates a time level, different time levels correspond to different first time lengths, and a corresponding first time length may be determined through a certain time level.

Herein, the first time length is an absolute time length; or, the first time length is an integral multiple of a time-domain symbol (for example, OFDM symbol) length.

For example, if the parameter is X=4, here, X represents the first time length, the first time length is four time-domain symbols. For another example, if the parameter is L=1, here, L represents the time level, the first time length is a time length corresponding to the time level 1, and is hypothesized to be three symbols.

In an implementation mode, the first time length is configured to determine the time required by the terminal device to perform blind detection of the downlink control channel in the target resource region for N times, which means that: the first time length is configured to determine a shortest time or a lower time limit required by the terminal device to perform blind detection of the downlink control channel in the target resource region for N times.

In the embodiment of the disclosure, a starting position of the time required by the terminal device to perform blind detection of the downlink control channel in the target resource region for N times is a predefined time position in the target resource region. In an implementation mode, the predefined time position is a time-domain starting position of the target resource region, or a starting position of a second time-domain symbol in the target resource region, or an ending position of a time-domain symbol where a DMRS is located in the target resource region. For example, the predefined time position is the time-domain starting position of the target resource region, that is, the terminal device performs blind detection of the downlink control channel starting from the time-domain starting position of the target resource region. For another example, the predefined time position is the starting position of the second time-domain symbol in the target resource region, that is, the terminal device performs blind detection of the downlink control channel starting from the starting position of the second time-domain symbol in the target resource region. For another example, the predefined time position is the ending position of the time-domain symbol where the DMRS is located in the target resource region, that is, the terminal device performs blind detection of the downlink control channel starting from the ending position of the time-domain symbol where the DMRS is located in the target resource region.

In the embodiment of the disclosure, a length of the time required by the terminal device to perform blind detection of the downlink control channel in the target resource region for N times may be determined in the following two manners.

1) The length of the time required by the terminal device to perform blind detection of the downlink control channel in the target resource region for N times is the first time length.

Herein, the first time length is a total time length for blind detection, the first time length is greater than a time length of the target resource region.

2) The length of the time required by the terminal device to perform blind detection of the downlink control channel in the target resource region for N times is a sum of a predefined time length of the target resource region and the first time length, here, the predefined time length is a length from the predefined time position to an ending position of a last time-domain symbol in the target resource region. For example, the predefined time length is a length from the starting position of the first time-domain symbol to the ending position of the last time-domain symbol in the target resource region. For another example, the predefined time length is a length from the starting position of the second time-domain symbol to the ending position of the last time-domain symbol in the target resource region. For another example, the predefined time length is a length from the ending position of the time-domain symbol where the DMRS is located to the ending position of the last time-domain symbol in the target resource region.

Herein, the predefined time length of the target resource region is added to the first time length to obtain a total time length for blind detection.

In the embodiment of the disclosure, the target resource region supports P transmission resource configurations, P≥2, and different transmission resource configurations have different time-domain lengths and/or different frequency-domain lengths. Here, when different transmission resource configurations are adopted for the target resource region, different values of N are correspondingly adopted.

For example, the target resource region is a CORESET, a time length of the CORESET (i.e., a length of the CORESET in time) may be one OFDM symbol, or may be two OFDM symbols or may be three OFDM symbols. These three conditions correspond to three transmission resource configurations respectively, and the three transmission resource configurations correspond to different values of N respectively.

In the embodiment of the disclosure, the target resource region supports P transmission resource configurations, P≥2, and different transmission resource configurations have different time-domain lengths and/or different frequency-domain lengths. Here, the parameter includes Q first time lengths, 1≤Q≤P, and each of the Q first time lengths corresponds to a different transmission resource configuration.

For example, the target resource region is a CORESET, a time length of the CORESET may be one OFDM symbol, or may be two OFDM symbols or may be three OFDM symbols. These three conditions correspond to three transmission resource configurations respectively, and the parameter includes three first time lengths corresponding to the three transmission resource configurations respectively.

A second manner: the parameter is configured to determine a maximum number of blind detections of the downlink control channel in the target resource region by the terminal device in a specified time.

In the embodiment of the disclosure, the parameter is configured to determine the maximum number of blind detections, which may be implemented in the following manners: 1) the parameter indicates the specific number of blind detections; 2) the parameter indicates a blind detection level, different blind detection levels correspond to different numbers of blind detections, and a corresponding number of blind detections may be determined through a certain blind detection level.

In the embodiment of the disclosure, a starting position of the specified time is a predefined time position in the target resource region. In an implementation mode, the predefined time position is a time-domain starting position of the target resource region, or a starting position of a second time-domain symbol in the target resource region, or an ending position of a time-domain symbol where a DMRS is located in the target resource region. For example, the predefined time position is the time-domain starting position of the target resource region, that is, the terminal device performs blind detection of the downlink control channel starting from the time-domain starting position of the target resource region. For another example, the predefined time position is the starting position of the second time-domain symbol in the target resource region, that is, the terminal device performs blind detection of the downlink control channel starting from the starting position of the second time-domain symbol in the target resource region. For another example, the predefined time position is the ending position of the time-domain symbol where the DMRS is located in the target resource region, that is, the terminal device performs blind detection of the downlink control channel starting from the ending position of the time-domain symbol where the DMRS is located in the target resource region.

In the embodiment of the disclosure, a time for blind detection of the downlink control channel in the target resource region by the terminal device, i.e., the specified time, may be determined in the following two manners.

1) A length of the specified time is a second time length. Herein, the second time length is a total time length for blind detection (i.e., the length of the specified time).

2) A length of the specified time is a sum of a predefined time length of the target resource region and a second time length, here, the predefined time length is a length from the predefined time position to an ending position of a last time-domain symbol in the target resource region. For example, the predefined time length is the length from the starting position of the first time-domain symbol to the ending position of the last time-domain symbol in the target resource region. For another example, the predefined time length is the length from the starting position of the second time-domain symbol to the ending position of the last time-domain symbol in the target resource region. For another example, the predefined time length is the length from the ending position of the time-domain symbol where the DMRS is located to the ending position of the last time-domain symbol in the target resource region.

Herein, the predefined time length of the target resource region is added to the second time length to obtain a total time length for blind detection.

Herein, the second time length is predefined by the protocol, or is reported to the network device by the terminal device, or is configured to the terminal device by the network device.

Herein, the second time length is an absolute time length; or, the second time length is an integral multiple of a time-domain symbol (for example, OFDM symbol) length.

In the embodiment of the disclosure, the target resource region supports P transmission resource configurations, P≥2, and different transmission resource configurations have different time-domain lengths and/or different frequency-domain lengths. Here, when different transmission resource configurations are adopted for the target resource region, different maximum numbers of blind detections are correspondingly adopted.

For example, the target resource region is a CORESET, a time length of the CORESET may be one OFDM symbol, or may be two OFDM symbols or may be three OFDM symbols, these three conditions correspond to three transmission resource configurations respectively, and the three transmission resource configurations correspond to different maximum numbers of blind detections respectively.

In the embodiment of the disclosure, the target resource region supports P transmission resource configurations, P≥2, and different transmission resource configurations have different time-domain lengths and/or different frequency-domain lengths. Here, the parameter includes T values, 1≤T≤P, and each of the T values corresponds to a different transmission resource configuration.

For example, the target resource region is a CORESET, a time length of the CORESET may be one OFDM symbol, or may be two OFDM symbols or may be three OFDM symbols, these three conditions correspond to three transmission resource configurations respectively, the parameter includes three values, configured to determine three maximum numbers of blind detections respectively, and these three maximum numbers of blind detections correspond to the three transmission resource configurations respectively.

In the technical solutions of the embodiments of the disclosure, the terminal device sends the first message to the network device, the first message includes the parameter for blind detection of the downlink control channel in the target resource region by the terminal device and the parameter represents a monitoring capability of the terminal device for the downlink control channel, so that the network device can configure, for the terminal device, a reasonable target resource region and the proper number of blind detections according to the parameter, so as to improve the flexibility of data scheduling on the premise of ensuring that the terminal device can complete demodulation of the downlink control channel.

The technical solutions of the embodiments of the disclosure will further be explained and described below in combination with specific application examples.

First Example

The target resource region is a CORESET, and a value of a length of the CORESET in the time domain is three OFDM symbols. The parameter in the first message sent to the network device by the terminal device is X, and X represents the first time length. The first time length is configured to determine a time required by the terminal device to perform blind detection of a PDCCH in the CORESET for N times, i.e., a total blind detection time, and a length of the total blind detection time is greater than the length of the CORESET. Herein, the length of the total blind detection time is equal to the first time length, and the terminal device performs blind detection of the PDCCH starting from a time-domain starting position of the CORESET.

Referring to FIG. 4, if N=44 and X=4 (OFDM symbol data), then at least four OFDM symbols are required by the terminal device to perform blind detection of the PDCCH for 44 times for one CORESET.

Second Example

The target resource region is a CORESET, and a value of a length of the CORESET in the time domain is three OFDM symbols. The parameter in the first message sent to the network device by the terminal device is Y, and Y represents the first time length. The first time length is configured to determine a time required by the terminal device to perform blind detection of a PDCCH in the CORESET for N times, i.e., a total blind detection time, and a length of the total blind detection time is greater than the length of the CORESET. Herein, the length of the total blind detection time is equal to a sum of the length of the CORESET and the first time length, and the terminal device performs blind detection of the PDCCH starting from a time-domain starting position of the CORESET.

Referring to FIG. 5, if N=44, Y=1 (OFDM symbol data) and the value of the length of the CORESET in the time domain is three OFDM symbols, then at least four OFDM symbols are required by the terminal device to perform blind detection of the PDCCH for 44 times for one CORESET.

Third Example

The target resource region is a CORESET, and a value of a length of the CORESET in the time domain may be 1 or 2 or 3 OFDM symbols. The parameter in the first message sent to the network device by the terminal device includes X1, X2 and X3 representing three first time lengths respectively, and the three first time lengths correspond to three transmission resource configurations of the CORESET respectively (i.e., configurations where the value of the length of the CORESET in the time domain is 1 or 2 or 3 OFDM symbols respectively). X1 is configured to determine a total blind detection time corresponding to the CORESET of which the time-domain length is one OFDM symbol. X2 is configured to determine a total blind detection time corresponding to the CORESET of which the time-domain length is two OFDM symbols. X3 is configured to determine a total blind detection time corresponding to the CORESET of which the time-domain length is three OFDM symbols.

Herein, a length of the total blind detection time is greater than the length of the CORESET, the length of the total blind detection time is equal to the first time length, and the terminal device performs blind detection of a PDCCH starting from a time-domain starting position of the CORESET.

If N=44, X1=3, X2=4 and X3=4, there are the following conditions.

If the time-domain length of the CORESET is one OFDM symbol, then at least three OFDM symbols are required by the terminal device to perform blind detection of the PDCCH for 44 times for one CORESET.

If the time-domain length of the CORESET is two OFDM symbols, then at least four OFDM symbols are required by the terminal device to perform blind detection of the PDCCH for 44 times for one CORESET.

If the time-domain length of the CORESET is three OFDM symbols, then at least four OFDM symbols are required by the terminal device to perform blind detection of the PDCCH for 44 times for one CORESET.

Fourth Example

The target resource region is a CORESET, and a value of a length of the CORESET in the time domain may be 1 or 2 or 3 OFDM symbols. The parameter in the first message sent to the network device by the terminal device includes Y1, Y2 and Y3 representing three first time lengths respectively, and the three first time lengths correspond to three transmission resource configurations of the CORESET respectively (i.e., configurations where the value of the length of the CORESET in the time domain is 1 or 2 or 3 OFDM symbols respectively). Y1 is configured to determine a total blind detection time corresponding to the CORESET of which the time-domain length is one OFDM symbol. Y2 is configured to determine a total blind detection time corresponding to the CORESET of which the time-domain length is two OFDM symbols. Y3 is configured to determine a total blind detection time corresponding to the CORESET of which the time-domain length is three OFDM symbols.

Herein, a length of the total blind detection time is greater than the length of the CORESET, the length of the total blind detection time is equal to a sum of the length of the CORESET and the first time length, and the terminal device performs blind detection of a PDCCH starting from a time-domain starting position of the CORESET.

If N=44, Y1=2, Y2=2 and Y3=1, there are the following conditions.

If the time-domain length of the CORESET is one OFDM symbol, then at least three OFDM symbols are required by the terminal device to perform blind detection of the PDCCH for 44 times for one CORESET.

If the time-domain length of the CORESET is two OFDM symbols, then at least four OFDM symbols are required by the terminal device to perform blind detection of the PDCCH for 44 times for one CORESET.

If the time-domain length of the CORESET is three OFDM symbols, then at least four OFDM symbols are required by the terminal device to perform blind detection of the PDCCH for 44 times for one CORESET.

Fifth Example

The target resource region is a CORESET, and a value of a length of the CORESET in the time domain is three OFDM symbols. The parameter in the first message sent to the network device by the terminal device is S, and S represents the maximum number of blind detections of a PDCCH in the CORESET by the terminal device in a predetermined time. Herein, a length of the predetermined time is the second time length, and terminal device performs blind detection of the PDCCH starting from a time-domain starting position of the CORESET.

If the second time length is four OFDM symbols and S=44, then the terminal device performs, within four OFDM symbols, blind detection of the PDCCH for at most 44 times for one CORESET.

Sixth Example

The target resource region is a CORESET, and a value of a length of the CORESET in the time domain may be 1 or 2 or 3 OFDM symbols. The parameter in the first message sent to the network device by the terminal device includes S1, S2 and S3 representing three maximum numbers of blind detections respectively, and the three maximum numbers of blind detections correspond to three transmission resource configurations of the CORESET respectively (i.e., configurations where the value of the length of the CORESET in the time domain is 1 or 2 or 3 OFDM symbols respectively). S1 corresponds to the CORESET of which the time-domain length is one OFDM symbol, S2 corresponds to the CORESET of which the time-domain length is two OFDM symbols, and S3 corresponds to the CORESET of which the time-domain length is three OFDM symbols. Herein, a length of a total blind detection time is the second time length, and terminal device performs blind detection of a PDCCH starting from a time-domain starting position of the CORESET.

If the second time length is four OFDM symbols, S1=44, S2=44 and S3=32, there are the following conditions.

If the time-domain length of the CORESET is one OFDM symbol, then the terminal device performs, within four OFDM symbols, blind detection of the PDCCH for at most 44 times for one CORESET.

If the time-domain length of the CORESET is two OFDM symbols, then the terminal device performs, within four OFDM symbols, blind detection of the PDCCH for at most 44 times for one CORESET.

If the time-domain length of the CORESET is three OFDM symbols, then the terminal device performs, within four OFDM symbols, blind detection of the PDCCH for at most 32 times for one CORESET.

Seventh Example

The target resource region is a CORESET, and a value of a length of the CORESET in the time domain may be 1 or 2 or 3 OFDM symbols. The parameter in the first message sent to the network device by the terminal device includes level 1, level 1 and level 2, and the three pieces of level information in the first message correspond to three transmission resource configurations of the CORESET respectively (i.e., configurations where the value of the length of the CORESET in the time domain is 1 or 2 or 3 OFDM symbols respectively). Level 1 corresponds to the CORESET of which the time-domain length is one OFDM symbol, level 1 corresponds to the CORESET of which the time-domain length is two OFDM symbols, and level 3 corresponds to the CORESET of which the time-domain length is three OFDM symbols. Herein, a length of a total blind detection time is the second time length, and terminal device performs blind detection of a PDCCH starting from a time-domain starting position of the CORESET.

If the second time length is four OFDM symbols, the number of blind detections corresponding to level 1 is 44 and the number of blind detections corresponding to level 2 is 32, there are the following conditions.

If the time-domain length of the CORESET is one OFDM symbol, then the terminal device performs, within four OFDM symbols, blind detection of the PDCCH for at most 44 times for one CORESET.

If the time-domain length of the CORESET is two OFDM symbols, then the terminal device performs, within four OFDM symbols, blind detection of the PDCCH for at most 44 times for one CORESET.

If the time-domain length of the CORESET is three OFDM symbols, then the terminal device performs, within four OFDM symbols, blind detection of the PDCCH for at most 32 times for one CORESET in four OFDM symbols.

Eighth Example

The target resource region is a CORESET, and a value of a length of the CORESET in the time domain may be 1 or 2 or 3 OFDM symbols. The parameter in the first message sent to the network device by the terminal device includes level 1, level 2 and level 3, and the three pieces of level information in the first message correspond to three transmission resource configurations of the CORESET respectively (i.e., configurations where the value of the length of the CORESET in the time domain is 1 or 2 or 3 OFDM symbols respectively). Level 1 corresponds to the CORESET of which the time-domain length is one OFDM symbol, level 2 corresponds to the CORESET of which the time-domain length is two OFDM symbols, and level 3 corresponds to the CORESET of which the time-domain length is three OFDM symbols. Herein, a length of a total blind detection time is a sum of the length of the CORESET and the second time length, and terminal device performs blind detection of a PDCCH starting from a time-domain starting position of the CORESET.

If the second time length is one OFDM symbol, the number of blind detections corresponding to level 1 is 16, the number of blind detections corresponding to level 2 is 32 and the number of blind detections corresponding to level 3 is 44, there are the following conditions.

If the time-domain length of the CORESET is one OFDM symbol, then the terminal device performs, within two OFDM symbols, blind detection of the PDCCH for at most 16 times for one CORESET.

If the time-domain length of the CORESET is two OFDM symbols, then the terminal device performs, within three OFDM symbols, blind detection of the PDCCH for at most 32 times for one CORESET.

If the time-domain length of the CORESET is three OFDM symbols, then the terminal device performs, within four OFDM symbols, blind detection of the PDCCH for at most 44 times for one CORESET.

Figure 6:
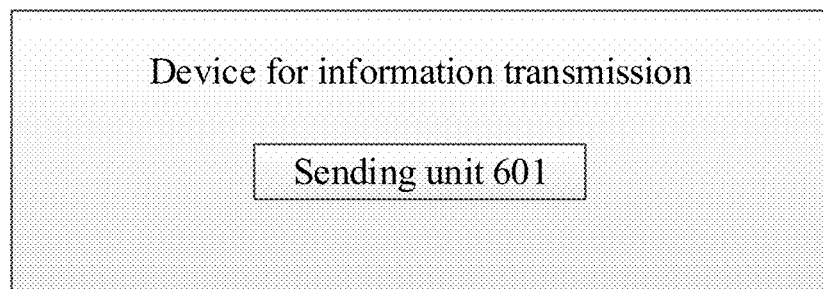
FIG. 6 is a first structure composition diagram of a device for information transmission according to an embodiment of the disclosure.

FIG. 6 is a first structure composition diagram of a device for information transmission according to an embodiment of the disclosure. As illustrated in FIG. 6, the device includes a sending unit 601.

The sending unit 601 is configured to send a first message to a network device, here, the first message includes a parameter for blind detection of a downlink control channel in a target resource region by a terminal device.

In an implementation mode, the parameter is configured to determine a first time length, and the first time length is configured to determine a time required by the terminal device to perform blind detection of the downlink control channel in the target resource region for N times, N≥1.

In an implementation mode, a starting position of the time required by the terminal device to perform blind detection of the downlink control channel in the target resource region for N times is a predefined time position in the target resource region.

In an implementation mode, the predefined time position is a time-domain starting position of the target resource region, or a starting position of a second time-domain symbol in the target resource region, or an ending position of a time-domain symbol where a DMRS is located in the target resource region.

In an implementation mode, a length of the time required by the terminal device to perform blind detection of the downlink control channel in the target resource region for N times is the first time length; or, a length of the time required by the terminal device to perform blind detection of the downlink control channel in the target resource region for N times is a sum of a predefined time length of the target resource region and the first time length, the predefined time length is a length from the predefined time position to an ending position of a last time-domain symbol in the target resource region.

In an implementation mode, the target resource region supports P transmission resource configurations, P≥2, and different transmission resource configurations have at least one of different time-domain lengths or different frequency-domain lengths. Here, when different transmission resource configurations are adopted for the target resource region, different values of N are correspondingly adopted.

In an implementation mode, the target resource region supports P transmission resource configurations, P≥2, and different transmission resource configurations have at least one of different time-domain lengths or different frequency-domain lengths.

The parameter includes Q first time lengths, 1≤Q≤P, and the Q first time lengths correspond to different transmission resource configurations respectively.

In an implementation mode, a value of N is predefined by a protocol, or reported to the network device by the terminal device, or configured to the terminal device by the network device.

In an implementation mode, the first time length is an absolute time length; or, the first time length is an integral multiple of a time-domain symbol length.

In an implementation mode, the parameter is configured to determine a maximum number of blind detections of the downlink control channel in the target resource region by the terminal device in a specified time.

In an implementation mode, a starting position of the specified time is a predefined time position in the target resource region.

In an implementation mode, the predefined time position is a time-domain starting position of the target resource region, or a starting position of a second time-domain symbol in the target resource region, or an ending position of a time-domain symbol where a DMRS is located in the target resource region.

In an implementation mode, a length of the specified time is a second time length; or, a length of the specified time is a sum of a predefined time length of the target resource region and a second time length, the predefined time length is a length from the predefined time position to an ending position of a last time-domain symbol in the target resource region.

In an implementation mode, the second time length is predefined by a protocol, or reported to the network device by the terminal device, or configured to the terminal device by the network device.

In an implementation mode, the second time length is an absolute time length; or, the second time length is an integral multiple of a time-domain symbol length.

In an implementation mode, the target resource region supports P transmission resource configurations, P≥2, and different transmission resource configurations have at least one of different time-domain lengths or different frequency-domain lengths. Here, when different transmission resource configurations are adopted for the target resource region, different maximum numbers of blind detections are correspondingly adopted.

In an implementation mode, the target resource region supports P transmission resource configurations, P≥2, and different transmission resource configurations have at least one of different time-domain lengths or different frequency-domain lengths. Here, the parameter includes T values, 1≤T≤P, and the T values correspond to different transmission resource configurations respectively.

In an implementation mode, the target resource region is a CORESET; or, the target resource region includes at least one consecutive time-domain symbol in a time domain.

In an implementation mode, the terminal device supports a URLLC service.

Those skilled in the art should know that functions realized by each unit in the device for information transmission illustrated in FIG. 6 may be understood with reference to related descriptions about the aforementioned method for information transmission. The functions of each unit in the device for information transmission illustrated in FIG. 6 may be realized through a program being run on a processor, or may be realized through a specific logical circuit.

Figure 7:
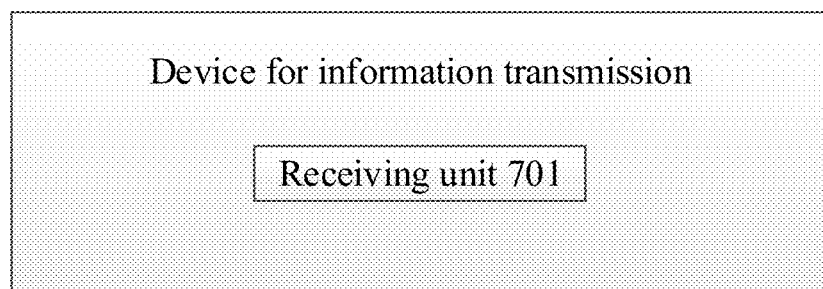
FIG. 7 is a second structure composition diagram of a device for information transmission according to an embodiment of the disclosure.

FIG. 7 is a second structure composition diagram of a device for information transmission according to an embodiment of the disclosure. As illustrated in FIG. 7, the device includes a receiving unit 701.

The receiving unit 701 is configured to receive a first message sent by a terminal device, here, the first message includes a parameter for blind detection of a downlink control channel in a target resource region by the terminal device.

In an implementation mode, the parameter is configured to determine a first time length, and the first time length is configured to determine a time required by the terminal device to perform blind detection of the downlink control channel in the target resource region for N times, N≥1.

In an implementation mode, a starting position of the time required by the terminal device to perform blind detection of the downlink control channel in the target resource region for N times is a predefined time position in the target resource region.

In an implementation mode, the predefined time position is a time-domain starting position of the target resource region, or a starting position of a second time-domain symbol in the target resource region, or an ending position of a time-domain symbol where a DMRS is located in the target resource region.

In an implementation mode, a length of the time required by the terminal device to perform blind detection of the downlink control channel in the target resource region for N times is the first time length; or, a length of the time required by the terminal device to perform blind detection of the downlink control channel in the target resource region for N times is a sum of a predefined time length of the target resource region and the first time length, the predefined time length is a length from the predefined time position to an ending position of a last time-domain symbol in the target resource region.

In an implementation mode, the target resource region supports P transmission resource configurations, P≥2, and different transmission resource configurations have at least one of different time-domain lengths or different frequency-domain lengths. Here, when different transmission resource configurations are adopted for the target resource region, different values of N are correspondingly adopted.

In an implementation mode, the target resource region supports P transmission resource configurations, P≥2, and different transmission resource configurations have at least one of different time-domain lengths or different frequency-domain lengths. Here, the parameter includes Q first time lengths, 1≤Q≤P, and the Q first time lengths correspond to different transmission resource configurations respectively.

In an implementation mode, a value of N is predefined by a protocol, or reported to a network device by the terminal device, or configured to the terminal device by a network device.

In an implementation mode, the first time length is an absolute time length; or, the first time length is an integral multiple of a time-domain symbol length.

In an implementation mode, the parameter is configured to determine a maximum number of blind detections of the downlink control channel in the target resource region by the terminal device in a specified time.

In an implementation mode, a starting position of the specified time is a predefined time position in the target resource region.

In an implementation mode, the predefined time position is a time-domain starting position of the target resource region, or a starting position of a second time-domain symbol in the target resource region, or an ending position of a time-domain symbol where a DMRS is located in the target resource region.

In an implementation mode, a length of the specified time is a second time length; or, a length of the specified time is a sum of a predefined time length of the target resource region and a second time length, the predefined time length is a length from the predefined time position to an ending position of a last time-domain symbol in the target resource region.

In an implementation mode, the second time length is predefined by a protocol, or reported to a network device by the terminal device, or configured to the terminal device by a network device.

In an implementation mode, the second time length is an absolute time length; or, the second time length is an integral multiple of a time-domain symbol length.

In an implementation mode, the target resource region supports P transmission resource configurations, $P \geq 2$, and different transmission resource configurations have at least one of different time-domain lengths or different frequency-domain lengths. Here, when different transmission resource configurations are adopted for the target resource region, different maximum numbers of blind detections are correspondingly adopted.

In an implementation mode, the target resource region supports P transmission resource configurations, $P \geq 2$, and different transmission resource configurations have at least one of different time-domain lengths or different frequency-domain lengths. Here, the parameter includes T values, $1 \leq T \leq P$, and the T values correspond to different transmission resource configurations respectively.

In an implementation mode, the target resource region is a CORESET; or, the target resource region includes at least one consecutive time-domain symbol in a time domain.

In an implementation mode, the terminal device supports a URLLC service.

Those skilled in the art should know that functions realized by each unit in the device for information transmission illustrated in FIG. 7 may be understood with reference to related descriptions about the aforementioned method for information transmission. The functions of each unit in the device for information transmission illustrated in FIG. 7 may be realized through a program being run on a processor, or may be realized through a specific logical circuit.

Figure 8:
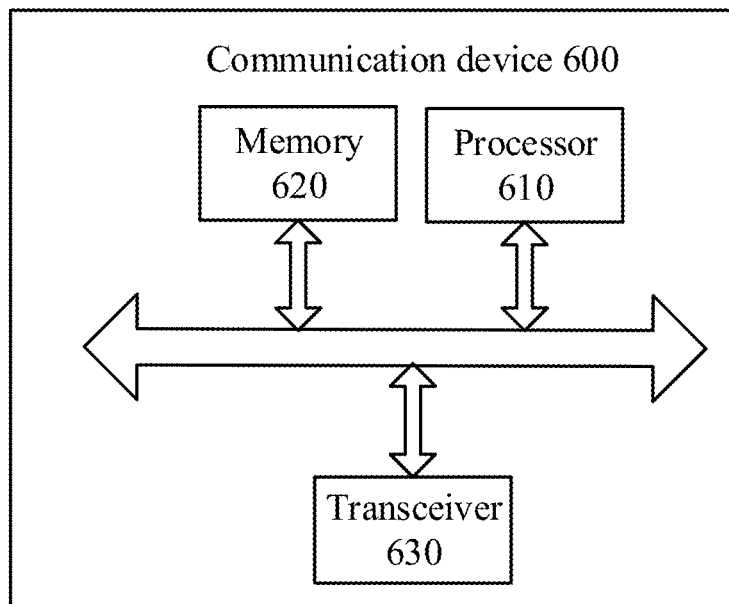
FIG. 8 is a structure diagram of a communication device according to an embodiment of the disclosure.

FIG. 8 is a structure diagram of a communication device 600 according to an embodiment of the disclosure. The communication device may be a terminal device or may be a network device. The communication device 600 illustrated in FIG. 8 includes a processor 610, and the processor 610 may call and run a computer program in a memory to implement the methods in the embodiments of the disclosure.

Optionally, as illustrated in FIG. 8, the communication device 600 may further include the memory 620. The processor 610 may call and run the computer program in the memory 620 to implement the methods in the embodiments of the disclosure.

The memory 620 may be a separate device independent of the processor 610 or may be integrated into the processor 610.

Optionally, as illustrated in FIG. 8, the communication device 600 may further include a transceiver 630, and the processor 610 may control the transceiver 630 to communicate with another device, specifically sending information or data to the another device or receiving information or data sent by the another device.

The transceiver 630 may include a transmitter and a receiver. The transceiver 630 may further include antennae, and the number of the antennae may be one or more.

Optionally, the communication device 600 may specifically be the network device in the embodiments of the disclosure, and the communication device 600 may implement corresponding flows implemented by the network device in each method of the embodiments of the disclosure. For simplicity, elaborations are omitted herein.

Optionally, the communication device 600 may specifically be the mobile terminal/terminal device in the embodiments of the disclosure, and the communication device 600 may implement corresponding flows implemented by the mobile terminal/terminal device in each method of the embodiments of the disclosure. For simplicity, elaborations are omitted herein.

Figure 9:
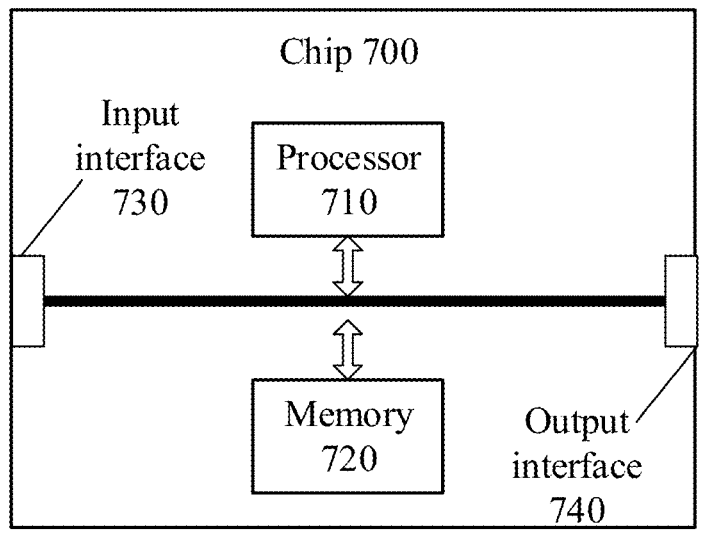
FIG. 9 is a structure diagram of a chip according to an embodiment of the disclosure.

FIG. 9 is a structure diagram of a chip according to an embodiment of the disclosure. The chip 700 illustrated in FIG. 9 includes a processor 710, and the processor 710 may call and run a computer program in a memory to implement the methods in the embodiments of the disclosure.

Optionally, as illustrated in FIG. 9, the chip 700 may further include the memory 720. The processor 710 may call and run the computer program in the memory 720 to implement the methods in the embodiments of the disclosure.

The memory 720 may be a separate device independent of the processor 710 or may be integrated into the processor 710.

Optionally, the chip 700 may further include an input interface 730. The processor 710 may control the input interface 730 to communicate with another device or chip, specifically acquiring information or data sent by the another device or chip.

Optionally, the chip 700 may further include an output interface 740. The processor 710 may control the output interface 740 to communicate with another device or chip, specifically outputting information or data to the another device or chip.

Optionally, the chip may be applied to the network device of the embodiments of the disclosure, and the chip may implement corresponding flows implemented by the network device in each method of the embodiments of the disclosure. For simplicity, elaborations are omitted herein.

Optionally, the chip may be applied to the mobile terminal/terminal device of the embodiments of the disclosure, and the chip may implement corresponding flows implemented by the mobile terminal/terminal device in each method of the embodiments of the disclosure. For simplicity, elaborations are omitted herein.

It is to be understood that the chip mentioned in the embodiment of the disclosure may also be called a system-level chip, a system chip, a chip system or a system on chip, etc.

Figure 10:
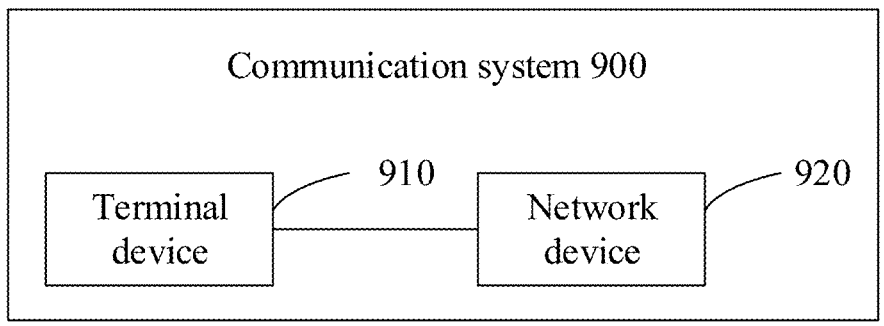
FIG. 10 is a block diagram of a communication system according to an embodiment of the disclosure.

FIG. 10 is a second block diagram of a communication system 900 according to an embodiment of the disclosure. As illustrated in FIG. 10, the communication system 900 includes a terminal device 910 and a network device 920.

The terminal device 910 may be configured to realize corresponding functions realized by the terminal device in the methods, and the network device 920 may be configured to realize corresponding functions realized by the network device in the methods. For simplicity, elaborations are omitted herein.

It is to be understood that the processor in the embodiments of the disclosure may be an integrated circuit chip and has a signal processing capacity. In an implementation process, each operation of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, operation and logical block diagram disclosed in the embodiments of the disclosure may be implemented or executed. The universal processor may be a microprocessor or the processor may be any conventional processor or the like. The operations of the methods disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the operations of the methods in combination with hardware.

It can be understood that the memory in the embodiments of the disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

It is to be understood that the memory is exemplarily but unlimitedly described. For example, the memory in the embodiments of the disclosure may also be an SRAM, a DRAM, an SDRAM, a DDR SDRAM, an ESDRAM, an SLDRAM, a DR RAM or the like. That is, the memory in the embodiments of the disclosure is intended to include, but not limited to, memories of these and any other proper types.

The embodiments of the disclosure also provide a computer-readable storage medium, which is configured to store a computer program.

Optionally, the computer-readable storage medium may be applied to the network device in the embodiments of the disclosure, and the computer program enables a computer to execute corresponding flows implemented by the network device in each method of the embodiments of the disclosure. For simplicity, elaborations are omitted herein.

Optionally, the computer-readable storage medium may be applied to the mobile terminal/terminal device in the embodiments of the disclosure, and the computer program enables a computer to execute corresponding flows implemented by the mobile terminal/terminal device in each method of the embodiments of the disclosure. For simplicity, elaborations are omitted herein.

The embodiments of the disclosure also provide a computer program product, which includes a computer program instruction.

Optionally, the computer program product may be applied to the network device in the embodiments of the disclosure, and the computer program instruction enables a computer to execute corresponding flows implemented by the network device in each method of the embodiments of the disclosure. For simplicity, elaborations are omitted herein.

Optionally, the computer program product may be applied to the mobile terminal/terminal device in the embodiments of the disclosure, and the computer program instruction enables the computer to execute corresponding flows implemented by the mobile terminal/terminal device in each method of the embodiments of the disclosure. For simplicity, elaborations are omitted herein.

The embodiments of the disclosure also provide a computer program.

Optionally, the computer program may be applied to the network device in the embodiments of the disclosure, and the computer program is run on a computer to enable the computer to execute corresponding flows implemented by the network device in each method of the embodiments of the disclosure. For simplicity, elaborations are omitted herein.

Optionally, the computer program may be applied to the mobile terminal/terminal device in the embodiments of the disclosure, and the computer program is run on the computer to enable the computer to execute corresponding flows implemented by the mobile terminal/terminal device in each method of the embodiments of the disclosure. For simplicity, elaborations are omitted herein.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that the specific working processes of the system, device and unit described above may refer to the corresponding processes in the method embodiments and will not be elaborated herein for convenient and brief description.

In some embodiments provided by the disclosure, it is to be understood that the disclosed system, device and method may be implemented in another manner. For example, the device embodiments described above are only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical or mechanical or adopt other forms.

The units described as separate parts may or may not be physically separated, and parts displayed as units may or may not be physical units, namely may be located in the same place, or may be distributed to multiple network units. Part or all of the units may be selected to achieve the purpose of the solutions of the embodiments according to a practical requirement.

In addition, each functional unit in each embodiment of the disclosure may be integrated into a processing unit, or each unit may physically exist independently, or two or more than two units may be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes, such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for information transmission, comprising:
sending, by a terminal device, a first message to a network device, the first message comprising a parameter for blind detection of a downlink control channel in a target resource region by the terminal device,
wherein the parameter can cause the network device to determine, based on the parameter, a maximum number of blind detections of the downlink control channel in the target resource region by the terminal device in a specified time,
wherein a starting position of the specified time is a predefined time position in the target resource region,
wherein a length of the specified time is a second time length, and
wherein the second time length is indicated to the network device by the terminal device.

2. The method of claim 1, wherein the predefined time position is a time-domain starting position of the target resource region.

3. The method of claim 1, wherein the second time length is an absolute time length; or, the second time length is an integral multiple of a time-domain symbol length.

4. The method of claim 1, wherein the target resource region is a Control Resource Set (CORESET); or, the target resource region comprises at least two consecutive time-domain symbols in a time domain.

5. The method of claim 1, wherein a length of the target resource region in time is two time-domain symbols or three time-domain symbols.

6. The method of claim 1, wherein the terminal device supports an Ultra-Reliable Low Latency Communication (URLLC) service.

7. A method for information transmission, comprising:
receiving, by a network device, a first message sent by a terminal device, the first message comprising a parameter for blind detection of a downlink control channel in a target resource region by the terminal device,
wherein the parameter can cause the network device to determine, based on the parameter, a maximum number of blind detections of the downlink control channel in the target resource region by the terminal device in a specified time,
wherein a starting position of the specified time is a predefined time position in the target resource region,
wherein a length of the specified time is a second time length, and
wherein the second time length is indicated to the network device by the terminal device.

8. The method of claim 7, wherein the predefined time position is a time-domain starting position of the target resource region.

9. The method of claim 7, wherein the second time length is an absolute time length; or, the second time length is an integral multiple of a time-domain symbol length.

10. The method of claim 7, wherein the target resource region is a Control Resource Set (CORESET); or, the target resource region comprises at least two consecutive time-domain symbols in a time domain.

11. The method of claim 7, wherein a length of the target resource region in time is two time-domain symbols or three time-domain symbols.

12. The method of claim 7, wherein the terminal device supports an Ultra-Reliable Low Latency Communication (URLLC) service.

13. A terminal device, comprising:
a processor;
a transceiver; and
a memory configured to store computer program instructions that, when executed by the processor, cause the processor to:
send a first message to a network device through the transceiver, the first message comprising a parameter for blind detection of a downlink control channel in a target resource region by the terminal device,
wherein the parameter can cause the network device to determine, based on the parameter, a maximum number of blind detections of the downlink control channel in the target resource region by the terminal device in a specified time,
wherein a starting position of the specified time is a predefined time position in the target resource region,
wherein a length of the specified time is a second time length, and
wherein the second time length is indicated to the network device by the terminal device.

14. The terminal device of claim 13, wherein the predefined time position is a time-domain starting position of the target resource region.

15. The terminal device of claim 13, wherein the second time length is an absolute time length; or, the second time length is an integral multiple of a time-domain symbol length.

16. The terminal device of claim 13, wherein the target resource region is a Control Resource Set (CORESET); or, the target resource region comprises at least two consecutive time-domain symbols in a time domain.

17. The terminal device of claim 13, wherein a length of the target resource region in time is two time-domain symbols or three time-domain symbols.

18. The terminal device of claim 13, wherein the terminal device supports an Ultra-Reliable Low Latency Communication (URLLC) service.

19. A chip, comprising a processor, configured to call and run a computer program in a memory to enable a terminal device installed with the chip to perform information transmission functions comprising:

sending a first message to a network device, the first message comprising a parameter for blind detection of a downlink control channel in a target resource region by the terminal device, wherein the parameter can cause the network device to determine, based on the parameter, a maximum number of blind detections of the downlink control channel in the target resource region by the terminal device in a specified time, wherein a starting position of the specified time is a predefined time position in the target resource region, wherein a length of the specified time is a second time length, and wherein the second time length is indicated to the network device by the terminal device.

* * * * *